United States Patent [19]

Palmer

[11] Patent Number: 5,358,294
[45] Date of Patent: Oct. 25, 1994

[54] BUMPER FOR VEHICLES

[75] Inventor: Eberhard Palmer, Niefern, Fed. Rep. of Germany

[73] Assignee: Dr. Ing. h.c.F. Porsche AG, Fed. Rep. of Germany

[21] Appl. No.: 36,720

[22] Filed: Mar. 25, 1993

[30] Foreign Application Priority Data

Mar. 31, 1992 [DE] Fed. Rep. of Germany ....... 4210476
Dec. 4, 1992 [DE] Fed. Rep. of Germany ....... 4240826

[51] Int. Cl.$^5$ .............................................. B60R 19/24
[52] U.S. Cl. .................................... 293/155; 293/121; 293/135
[58] Field of Search ............... 293/121, 132, 135, 136, 293/154, 155, 120

[56] References Cited

U.S. PATENT DOCUMENTS

| | | | |
|---|---|---|---|
| 1,406,921 | 2/1922 | Bowen | 293/155 X |
| 1,410,343 | 3/1922 | Nieschang | 293/155 |
| 1,422,103 | 7/1922 | MacInnes . | |
| 1,617,824 | 2/1927 | Saffold | 293/155 X |
| 1,702,941 | 2/1929 | Hardy | 293/155 X |
| 1,727,365 | 9/1929 | Bremer | 293/155 X |
| 1,957,515 | 5/1934 | Williams | 293/135 |
| 3,815,946 | 6/1974 | Jollig | 293/155 X |
| 4,010,969 | 3/1977 | Cantrell et al. | 293/102 |
| 4,252,355 | 2/1981 | Goupy et al. | 293/132 X |
| 4,372,701 | 2/1983 | Watanabe | 293/155 X |
| 5,114,198 | 5/1992 | Yamashita et al. | 293/155 X |

FOREIGN PATENT DOCUMENTS

| | | |
|---|---|---|
| 2255277 | 5/1974 | Fed. Rep. of Germany . |
| 2481218 | 10/1981 | France . |
| 325692 | 2/1930 | United Kingdom ................ 293/135 |
| 2022212 | 12/1979 | United Kingdom . |

Primary Examiner—Dennis H. Pedder
Attorney, Agent, or Firm—Evenson, McKeown, Edwards & Lenahan

[57] ABSTRACT

A bumper for vehicles, particularly passenger cars, has a dimensionally stable support which is held in position on an adjacent vehicle body by holders. In order to reduce the expenditures of time and cost during the manufacturing of the dimensionally stable support and of the holders, the holders are integrally constructed in one piece with the dimensionally stable support.

9 Claims, 5 Drawing Sheets

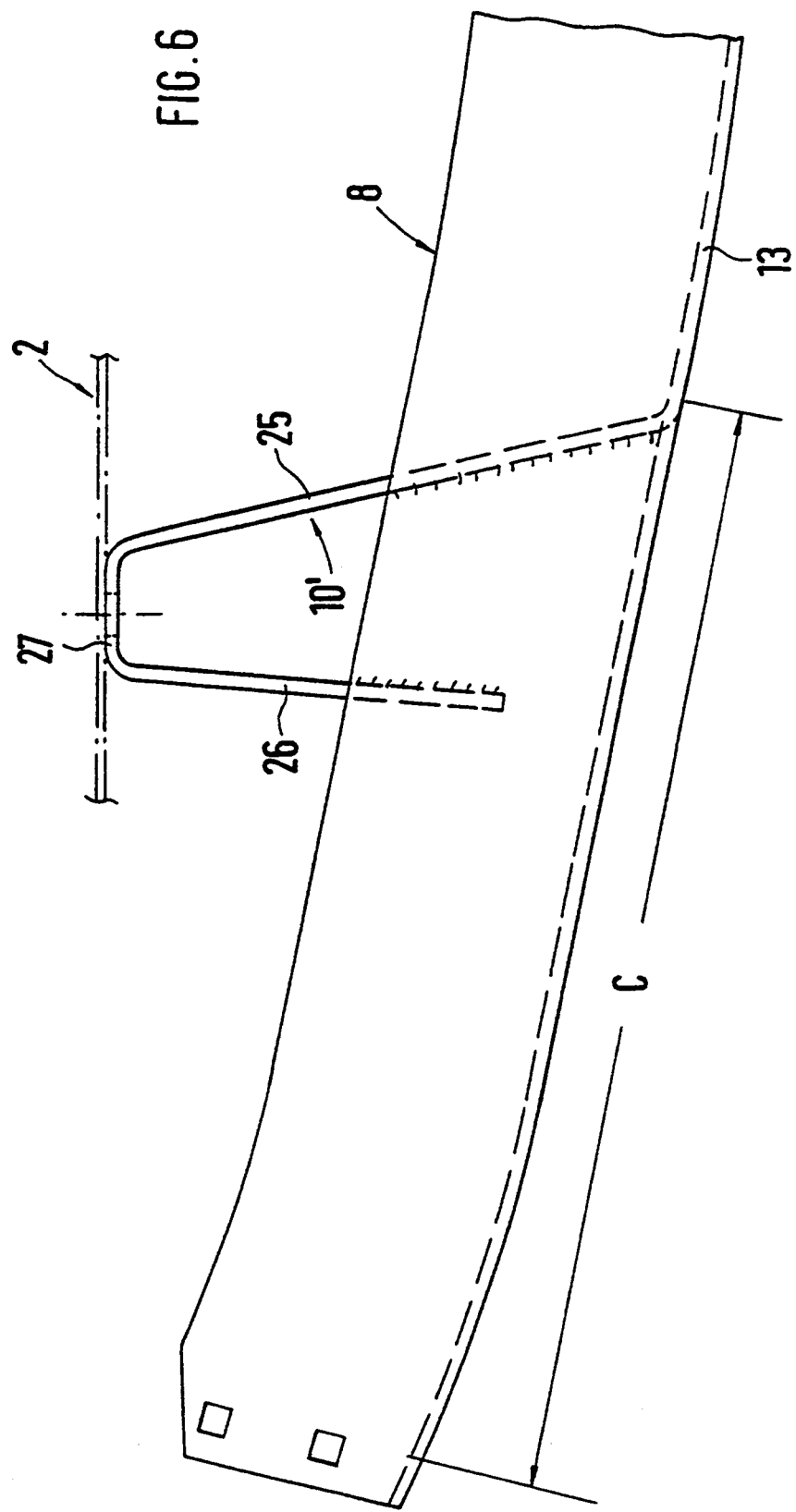

BUMPER FOR VEHICLES

BACKGROUND AND SUMMARY OF THE INVENTION

The present invention relates to a bumper for vehicles, particularly for passenger cars, which has a dimensionally stable support held in position on the adjacent vehicle body by holders.

U.S. Pat. No. 4,010,969 shows a bumper in which the dimensionally stable support and the holders are manufactured separately of one another and are subsequently connected with one another. This arrangement has the disadvantage that the manufacturing and mounting of the holders cause considerable expenditures with respect to time and cost.

An object of the invention is to reduce, with respect to a bumper of the first described type, the expenditures of time and cost during the manufacturing of the dimensionally stable support and of the holders.

This and other objects are achieved by the present invention which provides a bumper for a vehicle having a vehicle body, comprising a dimensionally stable support, and holders which hold the dimensionally stable support on the vehicle body. The holders are integrally constructed in one piece with the dimensionally stable support.

Some of the principal advantages achieved by the present invention are that, as a result of the integration of the holders into the dimensionally stable support, considerable time and costs are saved during the manufacturing of the support and of the holders.

In certain embodiments of the invention, the holding devices are formed by locally cut-free sections of the vertical web of the dimensionally stable support which are directed toward the vehicle body. An additional stiffening of the holders is achieved by the fact that, at least in sections, they are welded together with adjacent horizontal legs of the dimensionally stable support.

In addition, in certain embodiments of the present invention, the bent-away web is provided locally with stiffening beads. By means of the U-shaped or V-shaped construction of the holder in certain embodiments, high forces may be absorbed, in which case the energy absorption can be controlled in a defined manner by the geometry of the holder and by the clamping length (length of the weld seam).

Other objects, advantages and novel features of the present invention will become apparent from the following detailed description of the invention when considered in conjunction with the accompanying drawings.

BRIEF DESCRIPTION OF THE DRAWINGS

FIG. 6 is a partial top view of the dimensionally stable support with a second embodiment of an integrated holder.

DETAILED DESCRIPTION OF THE DRAWINGS

Figure 1:
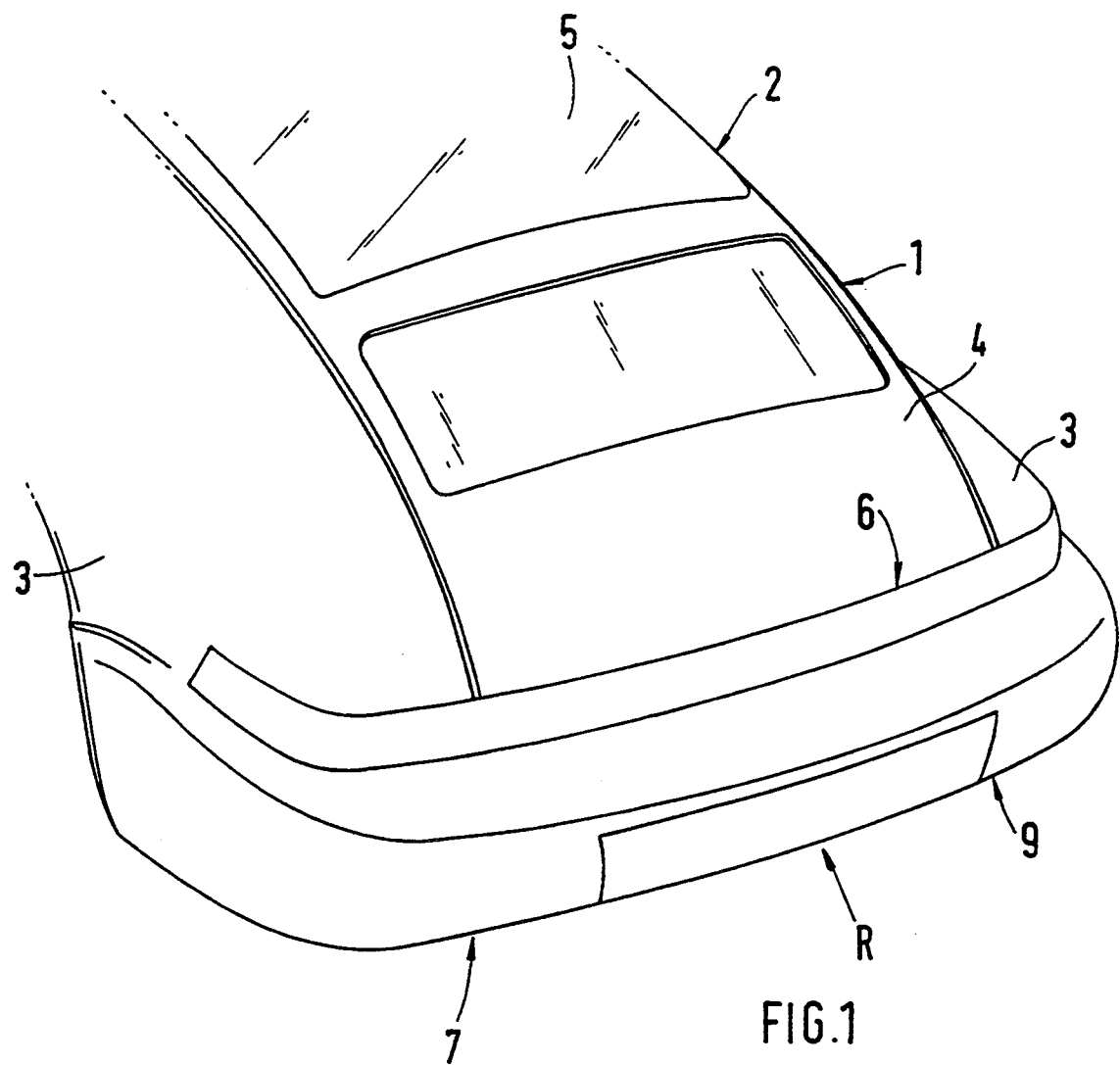
FIG. 1 is an oblique rear view of a passenger car with a bumper constructed in accordance with an embodiment of the present invention.

In FIG. 1, the passenger car 1 has a body 2 comprising two side parts 3, a tail gate 4, a rear window 5 and a lamp unit 6. The lamp unit 6 extends along a significant portion of the width of the passenger car and has curved end sections which are adapted to the shape of the side parts 3.

Figure 2:
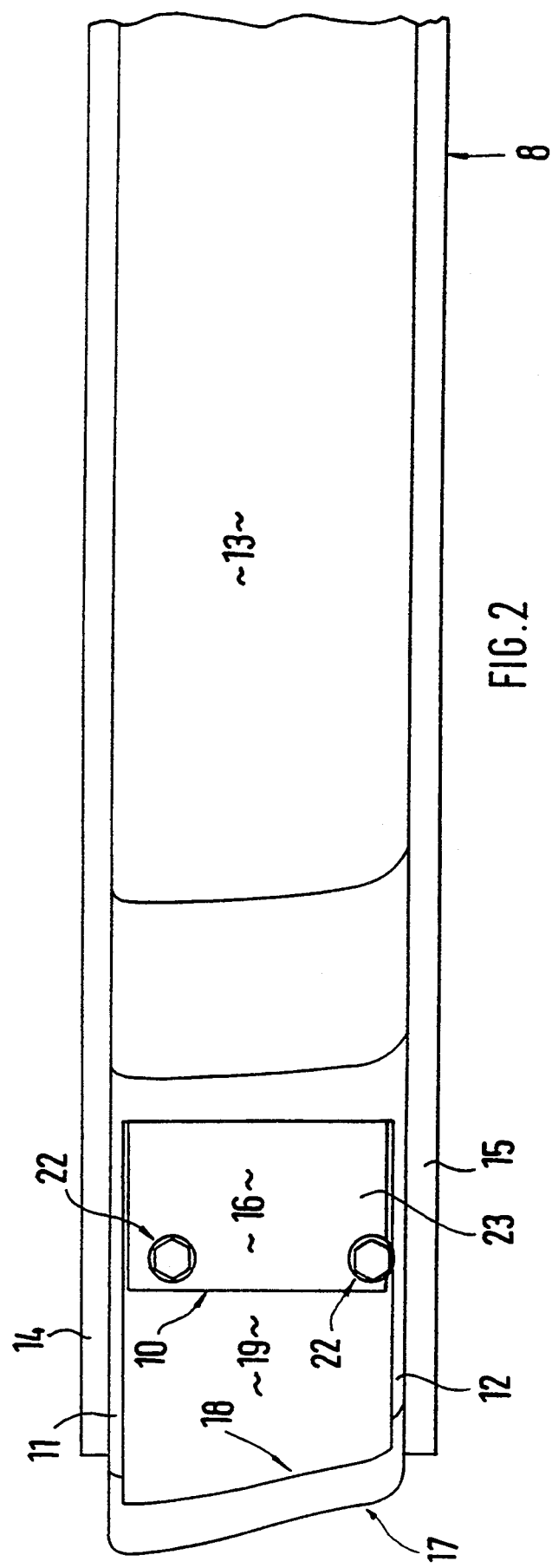
FIG. 2 is a partial view in the direction of the arrow R of a dimensionally stable support of the bumper constructed in accordance with an embodiment of the present invention.

Below the lamp unit 6, the vehicle body 2 is provided with a bumper 7. As seen in FIGS. 1 and 2, the bumper 7 comprises a dimensionally stable support 8 and an elastic covering 9 which forms the end area of the vehicle body 2.

The support 8, which is profiled in an approximately U-shaped manner, is formed by an extruded profile made of a light metal (aluminum alloy) and is held in position on the adjacent vehicle body 2 by holders 10.

Figure 4:
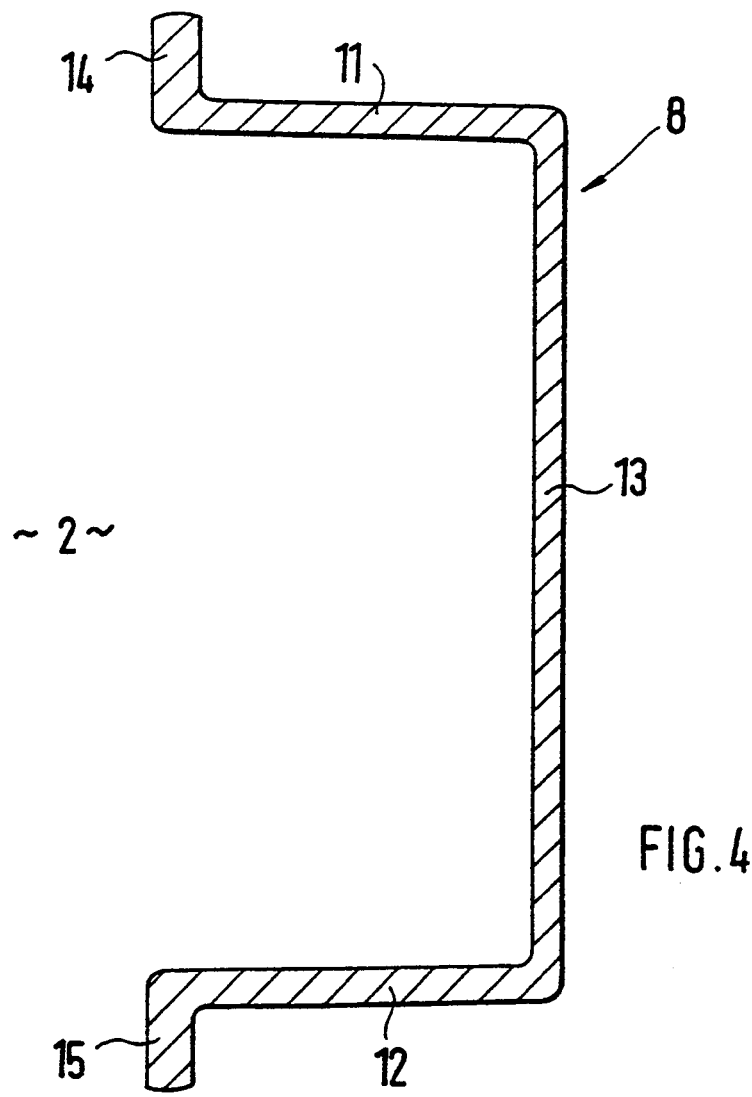
FIG. 4 is an enlarged sectional view according to Line IV—IV of FIG. 3.

According to FIG. 4, the open side of the U-shaped support 8 faces the vehicle body 2. Two approximately horizontally aligned legs 11, 12 are connected with one another by a vertical web 13. Vertical flanges 14, 15 are molded to the free ends of the legs 11, 12, the flange 14 assigned to the leg 11 extending upwards, and the flange 15 assigned to the leg 12 being directed downward. The dimensionally stable support 8 can be made of, for example, metal, plastic or the like and in the cross-sectional view has a box-shaped design in certain embodiments.

The covering 9, which comprises a flexible plastic material, extends at a distance from the dimensionally stable support 8 and encases the support 8. The covering 9 may be constructed in one or several parts.

According to the invention, it is provided that the holders 10 are constructed in one piece with the dimensionally stable support 8.

Figure 3:
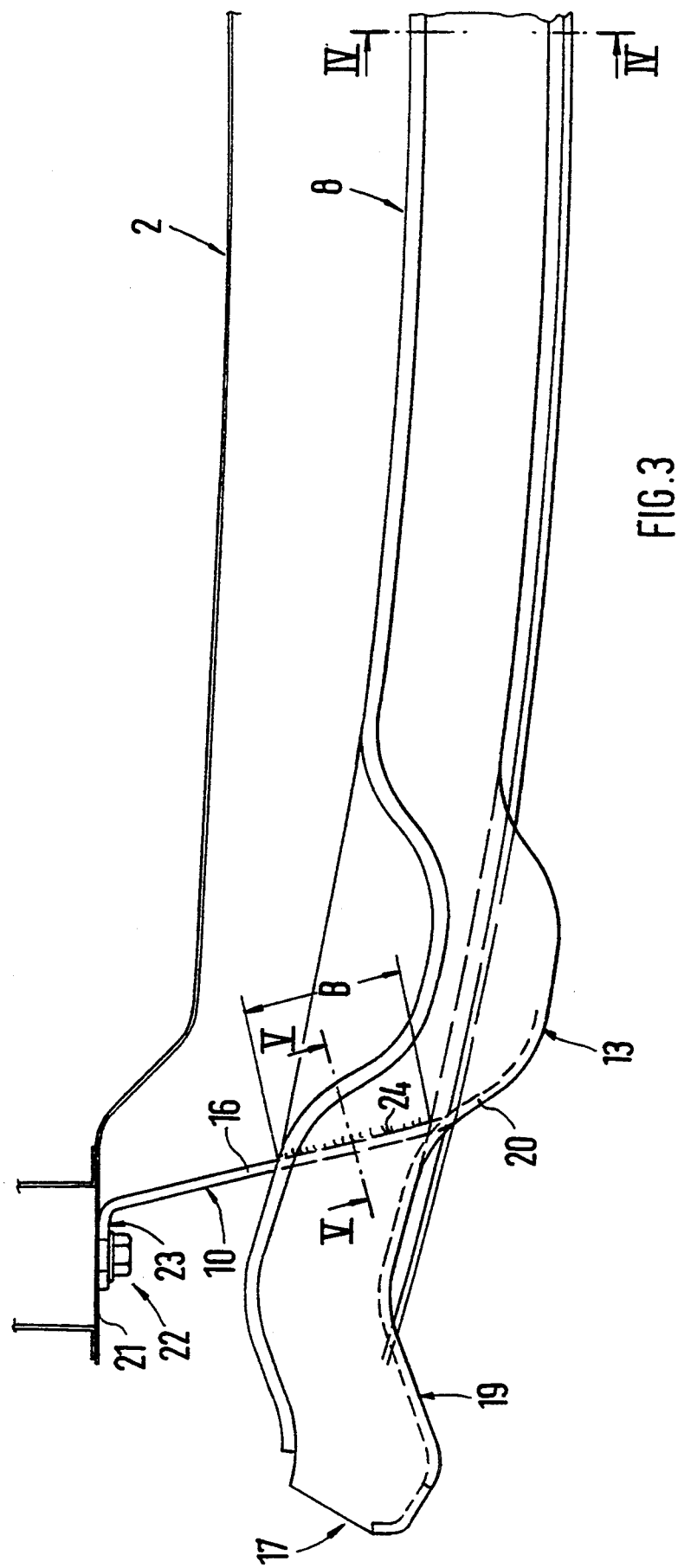
FIG. 3 is a top view of the dimensionally stable support of the bumper according to FIG. 2.

According to FIG. 3, each holder 10 is formed by a locally cut-free section 16 of the web 13 of the dimensionally stable support 8 which is directed toward the vehicle body 2, so that the section 16 is vertically aligned.

In the illustrated embodiment of FIG. 3, the holder 10 extends at a distance from the laterally exterior end area 17 of the dimensionally stable support 8 so that in the end area 17, the profile structure of the support 8 will remain the same. However, in certain embodiments the integrated holder 10 is arranged in the laterally exterior end area 17 of the dimensionally stable support 8.

For the manufacturing of the integrated holder 10, the vertical web 13 of the U-shaped profile of the dimensionally stable support 8 is cut free in sections below the leg 11 and above the leg 12 as well as in a laterally exterior upright area 18. The section 16 of the web 13 is then bent in the desired manner toward the inside or toward the rear in the direction of the vehicle body 2. The cutting free may take place, for example, by punching or laser cutting. By means of the cutting-free, a recess 19 is created on the dimensionally stable support 8 which is bounded on the edge side.

Corresponding to FIG. 3, the section 16 follows a bent integrated bumper guard section 20 of the dimensionally stable support 8. Then the section 16 extends diagonally toward the rear and outside in the direction of the vehicle body 2. The bent end area 23 of the section 16 which faces the vehicle body 2 extends in parallel to a transversely extending horizontal end wall 21 of the body 2. The end area 23 is held in position on the body 2 by screwable fastening elements 22, although other types of fastening are possible.

Figure 5:
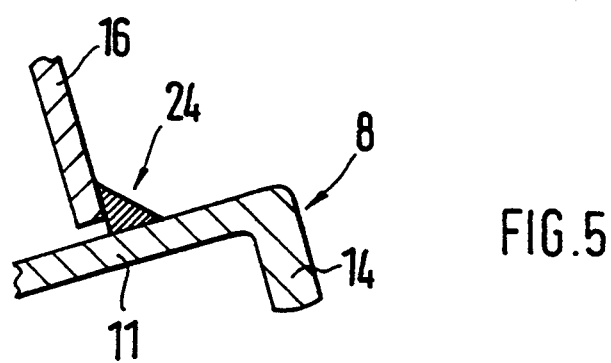
FIG. 5 is an enlarged sectional view according to Line V—V of FIG. 3.

As shown in FIG. 5, for stiffening the bumper holding device, the bent-away section 16 is connected, at least along a partial area B of its longitudinal course, with the adjacent upper and lower horizontal legs 11, 12 of the support 8. This may take place by welding (reference number 24), stamping together, or the like.

In addition, stiffening beads, which are not shown in detail, are provided on the section 16 in certain embodiments of the invention.

By means of a targeted shaping, section 16 may be designed such that the support 8 needs to absorb only a certain amount of energy. Higher energies are absorbed by the buckling or folding of the section 16. Thus any damage of the body-side supporting structure is avoided by the provision of a desired breaking point.

According to the embodiment of FIG. 6, the upright web 13 is cut free in its laterally exterior area C on top, on the bottom and on the side In the top view, the holder 10', which is constructed to be in one piece with the dimensionally stable support 8, has an approximately U-shaped or V-shaped construction, in which case the two upright longitudinally directed sections 25, 26 are connected at least in sections with the legs 11, 12 of the support 8 (for example, by means of welding). The U-shaped or V-shaped holding device 10' comprises the diagonally extending sections 25, 26 and a transversely extending connecting web 27. The connecting web 27 rests on the exterior side of the horizontal end wall 21 of the vehicle body 2 and is held in position there by screwable fastening elements 22. As a result of the geometry (angularity of the sections 25, 26 with respect to the support) and the clamping length (i.e., the length of the welding seam connecting the sections 25, 26 with the legs 11, 12), the energy absorption can be influenced in a defined manner. For each type of vehicle, these parameters of the holder 10' are determined empirically. The connection of the two sections 25, 26 with the support 8 makes the holder 10' considerably stiffer in the transverse direction than the holder 10 according to the first embodiment. The open side of the U-shaped or V-shaped holder 10' faces the support 8.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A bumper for a vehicle having a vehicle body, comprising:
   a dimensionally stable support having a web with a longitudinal axis;
   an elastic covering of the support;
   wherein the stable support is a contoured extruded profile, has horizontal legs, and has holders that hold the support to the vehicle body;
   wherein each holder is a partly severed, locally bent-away section of the web of the support and has a longitudinal course, with the longitudinal course of the bent-away section being substantially transverse to the longitudinal axis of the web, and wherein each bent-away section is connected to the horizontal legs at least along a partial area of the longitudinal course of the bent-away section.

2. A bumper according to claim 1, wherein the bent-away section has a bent end area that abuts the vehicle body and is connected with the vehicle body by detachable fastening elements.

3. A bumper according to claim 1, wherein the support includes exterior end areas, and the holders extend at a distance from the exterior end areas.

4. A bumper according to claim 1, wherein the bent-away section is welded together with horizontal legs.

5. A bumper according to claim 1, wherein each holder has an approximately U-shaped construction as seen in top view, an open side which faces the support.

6. A bumper according to claim 5, wherein each holder includes two longitudinally directed sections and a transversely extending connecting web, the sections longitudinally directed being welded together at least in sections with the horizontal legs of the dimensionally stable support.

7. A bumper according to claim 1, wherein each holder has an approximately V-shaped construction as seen in top view, and an open side which faces the dimensionally stable support.

8. A bumper according to claim 7, wherein each holder includes two longitudinally directed sections and a transversely extending connecting web, the sections longitudinally directed being welded together at least in sections with the horizontal legs of the dimensionally stable support.

9. A bumper according to claim 1, wherein the extruded profile is made of a light metal.

* * * * *